United States Patent [19]

Lane

[11] 4,277,956
[45] Jul. 14, 1981

[54] SPLINE DRIVE ARRANGEMENT

[75] Inventor: Jeffrey A. Lane, Olton, England

[73] Assignee: Lucas Industries Limited, Birmingham, England

[21] Appl. No.: 76,230

[22] Filed: Sep. 17, 1979

[30] Foreign Application Priority Data

Sep. 29, 1978 [GB] United Kingdom ............... 38800/78

[51] Int. Cl.³ .............................................. F16D 3/18
[52] U.S. Cl. .......................................... 64/9 R; 64/26; 64/30 C; 74/409
[58] Field of Search ..................... 64/9 R, 14, 26, 1 V, 64/30 C; 74/409; 188/290; 417/201, 203

[56] References Cited

U.S. PATENT DOCUMENTS

| 2,975,620 | 3/1961 | Shipley et al. | 64/9 R |
| 3,463,281 | 8/1969 | Aschauer | 188/290 |
| 3,511,349 | 5/1970 | Herscovici | 64/30 C |
| 3,757,535 | 9/1973 | Stein | 64/9 R |
| 4,204,413 | 5/1980 | Miller | 64/30 G |

FOREIGN PATENT DOCUMENTS

| 2355433 | 6/1974 | Fed. Rep. of Germany | 64/9 R |
| 2825957 | 2/1979 | Fed. Rep. of Germany | 64/26 |
| 396497 | 1/1974 | U.S.S.R. | 64/9 R |

Primary Examiner—Ira S. Lazarus
Assistant Examiner—Magdalen Moy

[57] ABSTRACT

A spline drive arrangement has two externally-splined shafts, which engage an internally-splined gear. An extension on the shaft is a relatively close fit in a bush which lines a bore in the shaft. The drive arrangement is maintained full of liquid which can enter and leave a space in the bore by way of restricted passages and a clearance zone between the extension and bush. Damping and viscous drag of the fluid tends to prevent relative movement, between the splines of the shaft and gear, which may occur if the torque load on the shaft is low.

4 Claims, 1 Drawing Figure

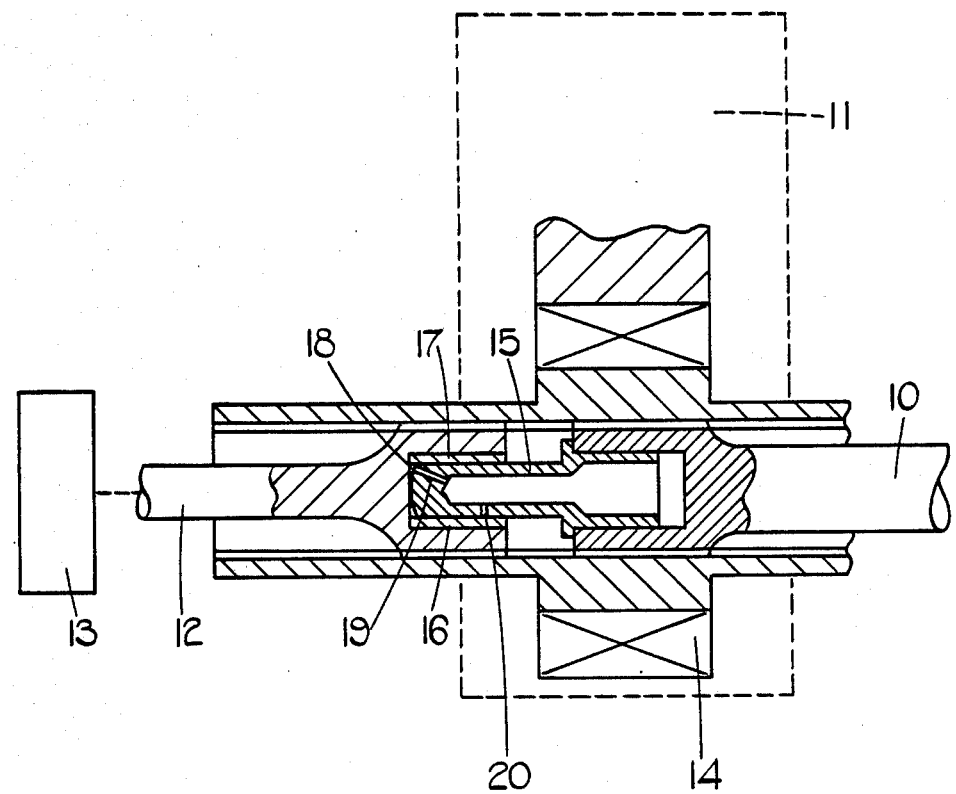

SPLINE DRIVE ARRANGEMENT

This invention relates to spline drive arrangements.

It is required to provide a drive arrangement in which an internally spline element is in simultaneous driving engagement with two externally spline elements, and in which the torque transmitted by one of the driving connections may be substantially higher than that of the other driving connection. In these circumstances, there may be relative movement between the spline elements providing the low torque connection, resulting in unacceptable wear of these elements. Such relative movement is insignificant at the higher torque connection, as a result of the torque load maintaining the spline faces in firm contact.

It is an object of the present invention to provide a drive arrangement of the foregoing kind, in which relative movements between the elements providing the low torque connection is substantially reduced.

According to the invention a spline drive arrangement comprises an internally splined element, first and second externally spline elements drivingly engaging said internally spline element, said first element having an axially extending portion, said second element having an axial bore in which said portion of the first element is a close fit, the free end of said portion and the adjacent end of said bore defining there between a space within said second element, means for maintaining said space full of a liquid, and flow restricting means through which said liquid can enter and leave said space.

In a preferred embodiment the periphery of said bore is of a relatively resilient material.

An embodiment of the invention will now be described by way of example only and with reference to the accompanying drawing.

An input shaft 10 applies a drive to a gear pump indicated generally at 11 and a further shaft 12 transmits the drive to a centrifugal pump, indicated at 13, which acts as a supply pump for the gear pump 11.

The shaft 10 is externally splined and engages internal splines in an axial bore of one gear 14 of the pump 11. The shaft 12 is also externally splined and drivingly engages the spline bore of the gear 14. An axial extension part 15 is mounted within the spline and of the shaft 10 so as to rotate therewith. An axial blind bore 16 in the splined portion of the shaft 12 has a liner bush 17 of 35% lead-bronze alloy, the bush 17 engaging the shaft 12 so as to rotate therewith. The part 15 is a close fit within the bush 17 and has a part-spherical end which engages the bottom of the bore 16 so as to define a space 18 therein. The space 18 communicates with the bore of the gear 14 by way of a restricted passage 19, a cavity within the part 15, a further restricted passage 20, and the clearance between the part 15 and the bush 17.

In use, the bore of the gear 14 is maintained full of liquid which is at the inlet pressure of the pump 11, this liquid being delivered by the pump 13. It is ensured, on assembly, that the space 18, passages 19, 20 and the cavity within the part 15 are also initially filled with liquid. The torque load imposed by the pump 11 is relatively high, and the resultant circumferential force between the gear 14 and the shaft 10 prevents significant relative movement between these parts. The torque load imposed by the pump 13 is relatively light, and in known arrangements relative axial movement, relative rotation and relative axial inclination between the shaft 12 and gear 14 has been found to occur.

In an arrangement according to the present invention relative axial movement is restrained by the restriction on flow of liquid to and from the space 18. Relative rotation is inhibited by the viscous drag of liquid in the clearance between the part 15 and the bush 17, this viscous drag being sufficient to prevent backlash between the splines. Relative inclination between the axes of the shaft 12 and gear 14 is prevented by engagement between the parts 15 and bush 17. The material of the bush 17 has sufficient resilience that inter-engagement between these parts as a result of axial inclination does not result in permanent damage to the bush 17, which thus remains effective to ensure axial alignment for an acceptable working life of the arrangement.

I claim:

1. In a system including first and second pumps, a connecting shaft drivingly coupling said pumps and an input drive shaft coupled to said first pump, a splined coupling between said first pump, said input shaft and said connecting shaft, said coupling comprising an internally-splined part drivingly connected to said first pump, external spline portions on said input and connecting shafts respectively, one of said shafts having an axially-extending portion and the other of said shafts having an axial bore, said axially-extending portion and said bore being inter-engaged so as to restrain relative angular movement between the axes of said shafts, the free end of said axially-extending portion and said bore defining therebetween a space within said other shaft, means within said first pump for maintaining said space full of liquid, and flow restricting means through which said liquid can enter and leave said space.

2. In a system as claimed in claim 1 in which the periphery of said bore is of a relatively resilient material.

3. In a system as claimed in claim 2 in which said relatively resilient material comprises a 35% lead-bronze alloy.

4. In a system as claimed in any of claims 1, 2 or 3 in which said flow restricting means includes a clearance zone between said portion of said one shaft and said axial bore in said other shaft.

* * * * *